(12) United States Patent
Ward et al.

(10) Patent No.: US 12,434,603 B2
(45) Date of Patent: Oct. 7, 2025

(54) FOLDABLE VEHICLE SEAT

(71) Applicant: Textron Aviation Inc., Wichita, KS (US)

(72) Inventors: Barry John Ward, Bel Aire, KS (US); Matthew William Reese, Wichita, KS (US); Jason Michael Decker, Wichita, KS (US); Matthew Allen Paul, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 442 days.

(21) Appl. No.: 18/045,553

(22) Filed: Oct. 11, 2022

(65) Prior Publication Data

US 2023/0115357 A1    Apr. 13, 2023

Related U.S. Application Data

(60) Provisional application No. 63/254,848, filed on Oct. 12, 2021.

(51) Int. Cl.
*B64D 11/06* (2006.01)
*B60N 2/20* (2006.01)
*B60N 2/30* (2006.01)
*B60N 2/36* (2006.01)

(52) U.S. Cl.
CPC ........... *B60N 2/206* (2013.01); *B60N 2/3004* (2013.01); *B60N 2/36* (2013.01); *B64D 11/0627* (2014.12); *B64D 11/0639* (2014.12)

(58) Field of Classification Search
CPC ........ B60N 2/206; B60N 2/3004; B60N 2/36; B64D 11/0627; B64D 11/0639; A47C 7/622

USPC ............................................. 297/182, 188.06
See application file for complete search history.

(56) References Cited

U.S. PATENT DOCUMENTS

| | | | | |
|---|---|---|---|---|
| 4,637,648 A | * | 1/1987 | Okino | B60N 2/366 297/378.13 |
| 5,161,854 A | * | 11/1992 | Yokoto | A47C 7/40 297/182 |
| 5,788,324 A | * | 8/1998 | Shea | B60N 3/101 297/411.32 |
| 6,394,542 B2 | * | 5/2002 | Potisch | B60N 2/58 297/218.3 |
| 6,702,375 B1 | * | 3/2004 | Laskowski | B60R 7/043 297/283.1 |

(Continued)

FOREIGN PATENT DOCUMENTS

DE  3505047 C2 * 3/1999
DE  10057450 A1  5/2002

*Primary Examiner* — Milton Nelson, Jr.
(74) *Attorney, Agent, or Firm* — Avek IP, LLC

(57) ABSTRACT

A foldable vehicle seat includes a seat base having a seat support frame, a seat back extending from the seat base, and a foldable section connected to the seat back. The folded section has a folded and unfolded configuration, and comprises a hinge mechanism with a pivot point, a first support, a second support, and a top surface configured to store luggage thereon. The first support is connected to the hinge mechanism and is rotatable about the pivot point. Likewise, the second support is connected to the hinge mechanism and is rotatable about the pivot point. The first and second supports contain first and second magnets, respectively, which are configured to retain the foldable section in the folded configuration.

20 Claims, 17 Drawing Sheets

(56) References Cited

U.S. PATENT DOCUMENTS

| | | | |
|---|---|---|---|
| 7,559,594 B2 | 7/2009 | McMillen | |
| 9,463,727 B2 * | 10/2016 | Styn | B60N 2/206 |
| 10,406,959 B2 | 9/2019 | Vo et al. | |
| 2015/0224003 A1 * | 8/2015 | Allen | A61G 5/1094 |
| | | | 297/188.06 |

* cited by examiner

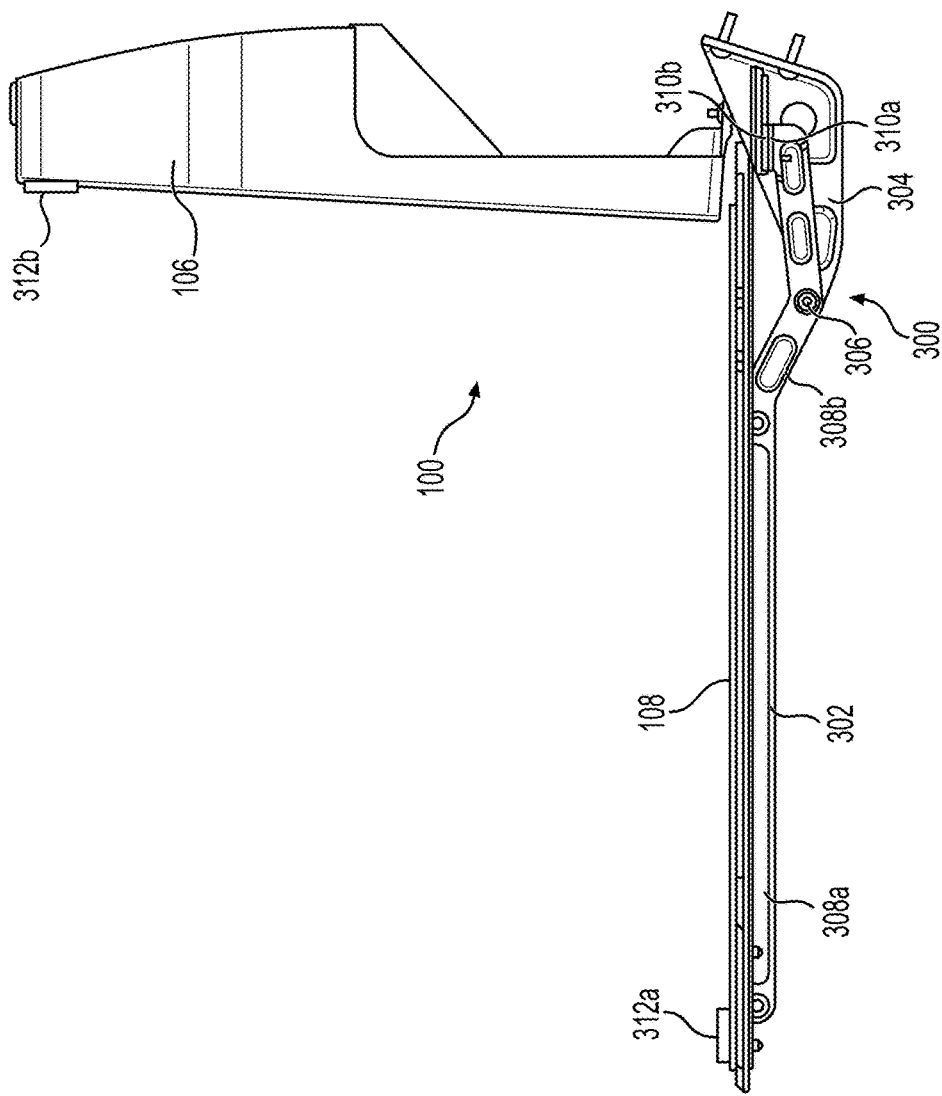
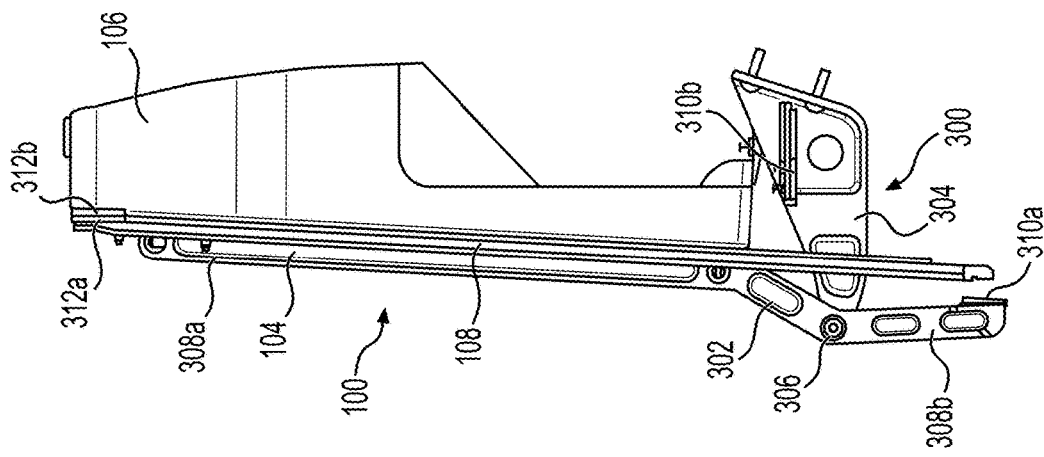
FIG. 7B
FIG. 7A

FOLDABLE VEHICLE SEAT

CROSS-REFERENCE TO RELATED APPLICATIONS

This application claims the benefit of priority of U.S. Provisional Patent Application No. 63/254,848, filed on Oct. 12, 2021, the disclosure of which is incorporated herein, in its entirety, by reference.

BACKGROUND

1. Field

The invention relates generally to the field of vehicle seating. More specifically, the embodiments relate to a foldable aviation seat for providing a convertible storage space.

2. Description of the Related Art

Many different types of vehicle seats have been described in the prior art. Typically, when it is desired to store luggage on a seat, the luggage would be placed directly on the seat, thus leading to damage of the upholstery.

What is needed is a seat providing a space for luggage storage that will avoid damage to the upholstery and other aesthetic aspects of the seats.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

Disclosed embodiments are generally directed to a foldable aircraft seat, although the present invention may apply to a variety of vehicles, such as an airplane, automobile, train, ATV, golf cart, or other types of vehicles. The present invention may be suitable for use in non-vehicular applications as well without departing from the scope of the invention.

According to an embodiment, a foldable vehicle seat includes a seat base having a seat support frame, a seat back extending from the seat base, and a foldable section connected to the seat back. The foldable section has a folded and unfolded configuration, and comprises a hinge mechanism with a pivot point, a first support, a second support, and a top surface configured to store luggage thereon. The first support is connected to the hinge mechanism and is rotatable about the pivot point. Likewise, the second support is connected to the hinge mechanism and is rotatable about the pivot point. The first and second supports contain first and second magnets, respectively, which are configured to retain the foldable section in the folded configuration.

In some embodiments, the foldable seat includes a third and fourth magnet configured to fold the folded section in the unfolded configuration. In other embodiments, the folded section includes a clip and/or clip assembly configured to hold the folded section in the unfolded configuration.

In some embodiments, the foldable vehicle seat includes anchors disposed within or on the foldable section which are configured to engage with a selectively attachable baggage restraint. In further embodiments, these anchors may be detachable from the foldable section of the seat. In certain embodiments, the top surface of the foldable section includes a protective, non-slip mat upon which luggage rests.

Some embodiments may include additional features which may enhance the comfort and/or convenience for the user. In one such embodiment, the top surface of the foldable section includes at least one recess, which may be used as a cupholder. In another embodiment, the foldable seat may include an item catcher configured to retain items which may have been accidentally dropped by a user. In these embodiments, it may be advantageous for the item catcher to be fashioned from a porous material or include a plurality of holes in order to allow some items to pass through, but not others.

BRIEF DESCRIPTION OF THE DRAWINGS

FIG. 7A illustrates a first embodiment of a hinge mechanism for the seat in the up position;

FIG. 7B illustrates the first embodiment of a hinge mechanism for the seat in the down position;

Figure 1A:
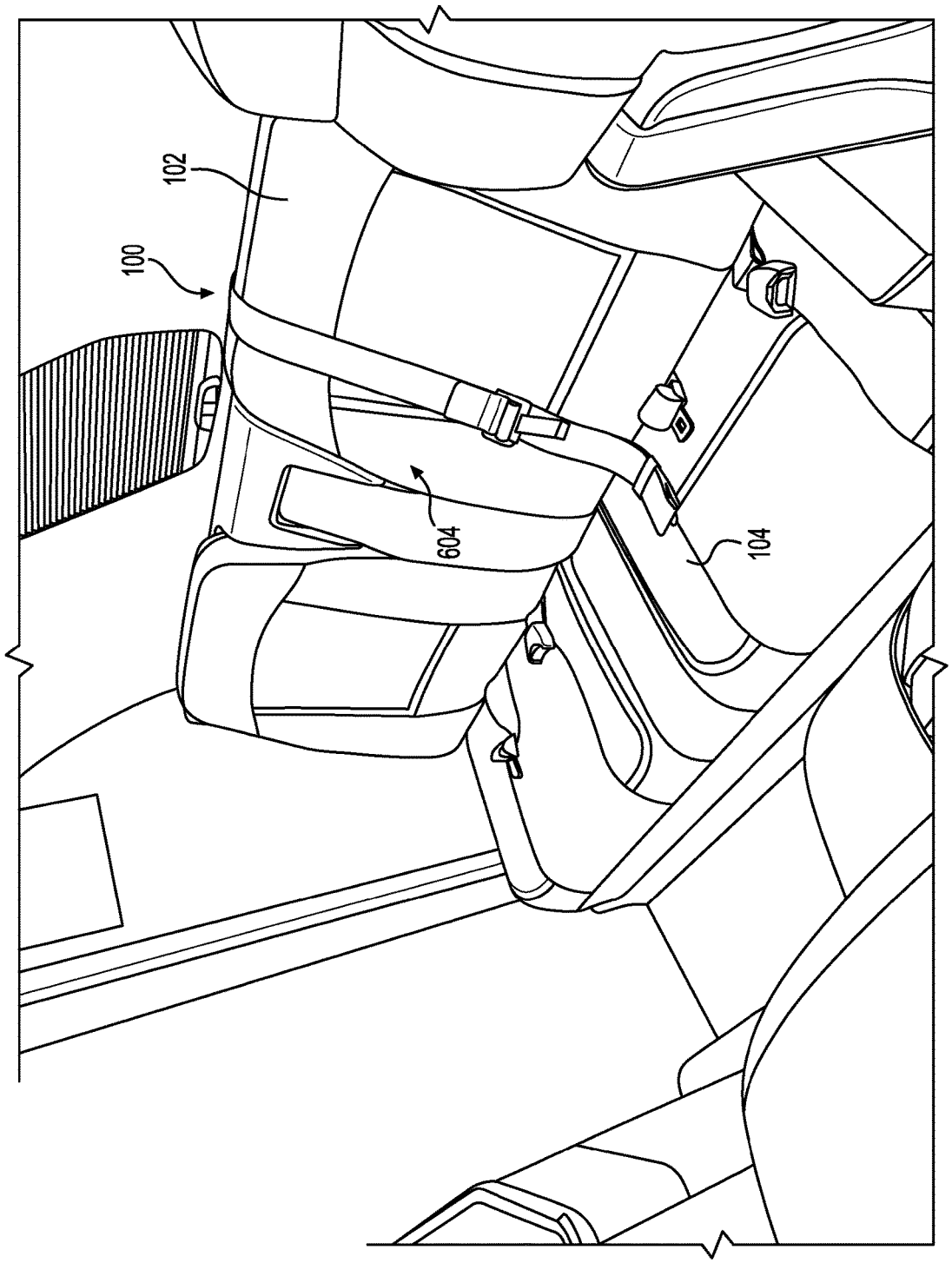
FIG. 1A illustrates a first embodiment of an aircraft couch seat with two foldable sections in an up position.

Illustrative embodiments are described in detail below with reference to the attached drawing figures, which are incorporated by reference herein and wherein:

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments are generally directed to an aircraft seat comprising a foldable section. The foldable section may allow for the placement of baggage and other items in the aircraft seat area without damaging the upholstery of the aircraft seat. The foldable section may comprise a mat for placing luggage thereon. The foldable section may comprise a hinge mechanism for rotating about a pivot point to move the foldable section between an up (unfolded) position and a down (folded) position.

In some embodiments, the foldable section comprises magnets for securing the foldable section in the up position and/or in the down position. In some embodiments, the foldable section comprises a clip mechanism for retaining the foldable section in the up position. The aircraft seat may also comprise a small item catcher disposed near the back to catch any items that may fall when moving the foldable section between the up position and the down position. In some embodiments, the aircraft seat may also comprise a baggage restraint net for inserting baggage therein and preventing the baggage from falling off the foldable back when the foldable section is in the down position and keep the baggage in place in the event of an accident. The baggage restraint may be attached to the aircraft seat using anchors stowed with the foldable section. While embodiments are described herein with reference to an aircraft seat, the aircraft seat, baggage restraint net, item catcher, or any combination thereof may be used in various other applications, such as automobiles, boats, trains, helicopters, theater seats, sofas, and the like.

Figure 1B:
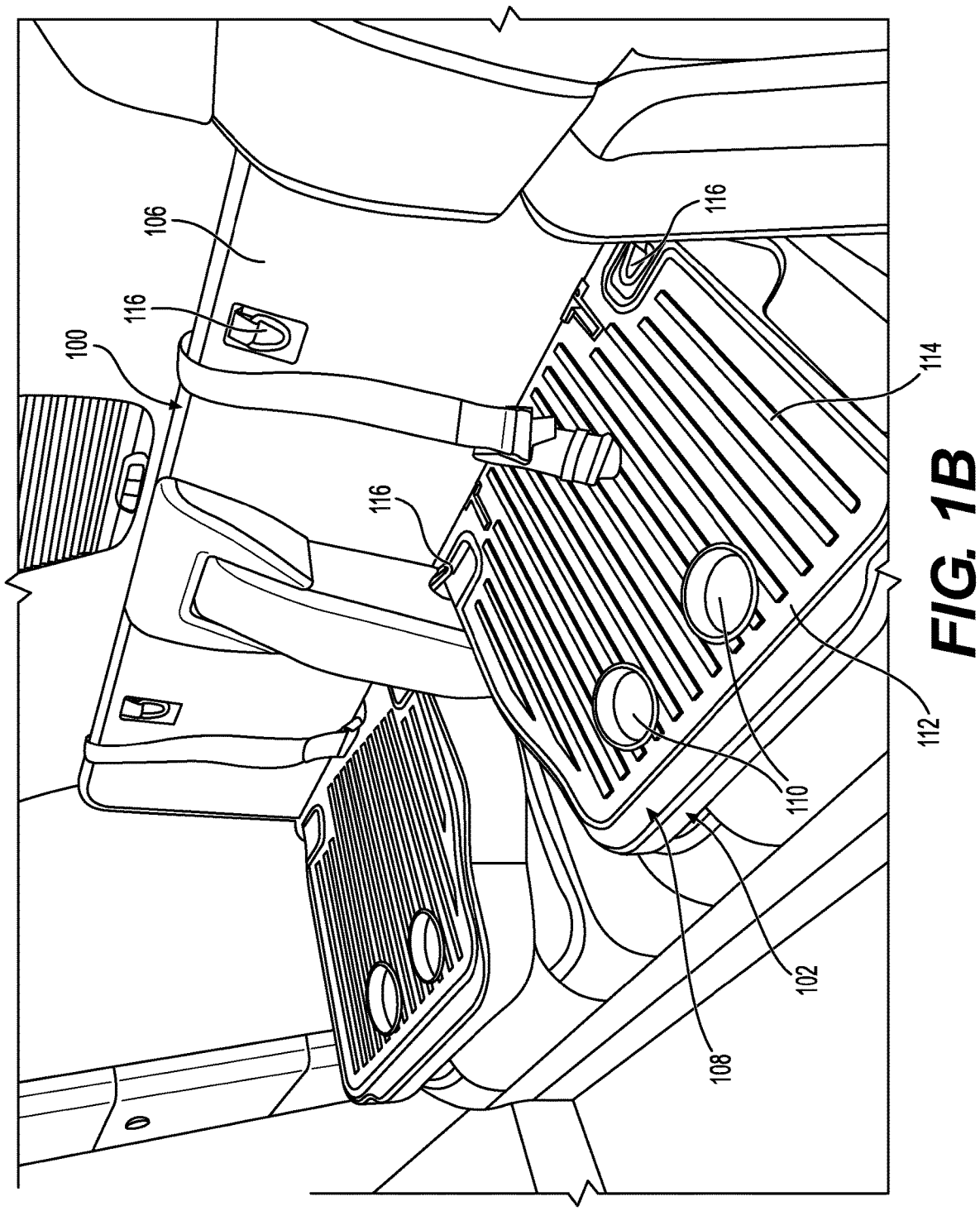
FIG. 1B illustrates the first embodiment of the aircraft couch seat with two foldable sections in a down position.

FIG. 1A illustrates an aircraft seat 100 in an up position for some embodiments. Aircraft seat 100 may comprise a foldable section 102 and a seat base 104 in some embodiments. Seat base 104 may be connected to foldable section 102 and a seat back 106 (see FIG. 1B). In some embodiments, seat base 104 and foldable section 102 may be substantially perpendicular thereto or foldable section 102 may be in a slightly reclined position. In some embodiments, seat base 104 and seat back 106 may be substantially perpendicular thereto or may have an obtuse angle therebetween. Aircraft seat 100 may be upholstered with materials such as leather, synthetic leather, wool, polyester, vinyl, cloth, or the like. When luggage is placed on the upholstery, damage is often incurred that may be costly to fix and detracts from the aesthetics of aircraft seat 100. As illustrated in FIG. 1B, foldable section 102 may fold downwards and the upholstered surface may abut against seat base 104, thus providing a top surface 108 on which luggage may be placed without damaging the upholstery on aircraft seat 100. When foldable section 102 moves to the down position, seat back 106 of aircraft seat 100 may be revealed. In some embodiments, foldable section 102 is connected to a hinge mechanism 300, 400, or 500 as will be discussed below with respect to FIGS. 7A, 7B, 8, and 9. When in the down position, luggage and other items may be stored on aircraft seat 100 without causing damage to the upholstery of aircraft seat 100. In some embodiments, multiple aircraft seats 100 may be used adjacent to or in combination with each other, such as to form a couch arrangement. In some embodiments, a single seat 100 may be arranged in any desired location in an aircraft or other vehicle.

Figure 2A:
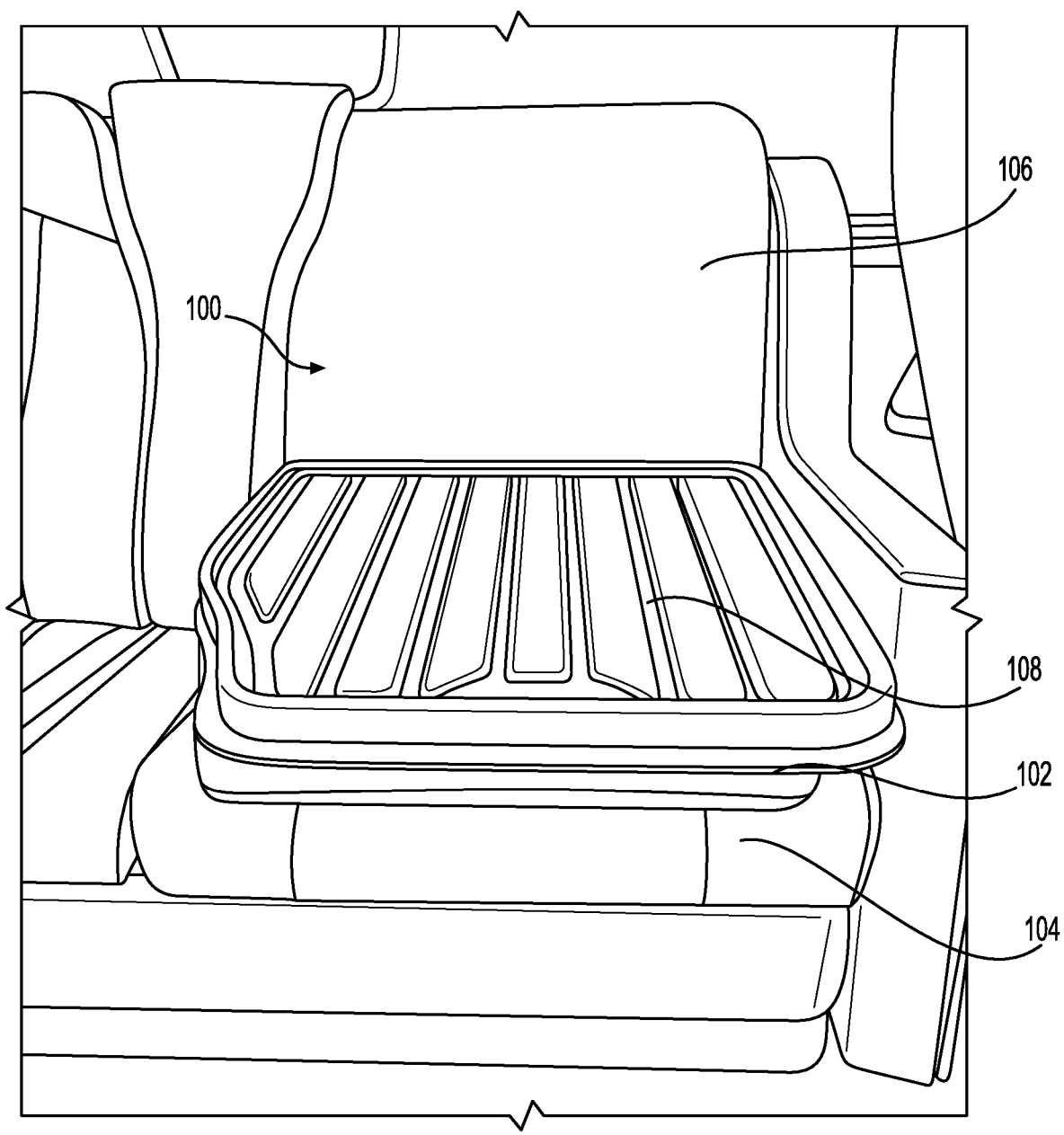
FIG. 2A illustrates partial front perspective view of a second embodiment of an aircraft couch seat with one foldable section in a down position.
Figure 2B:
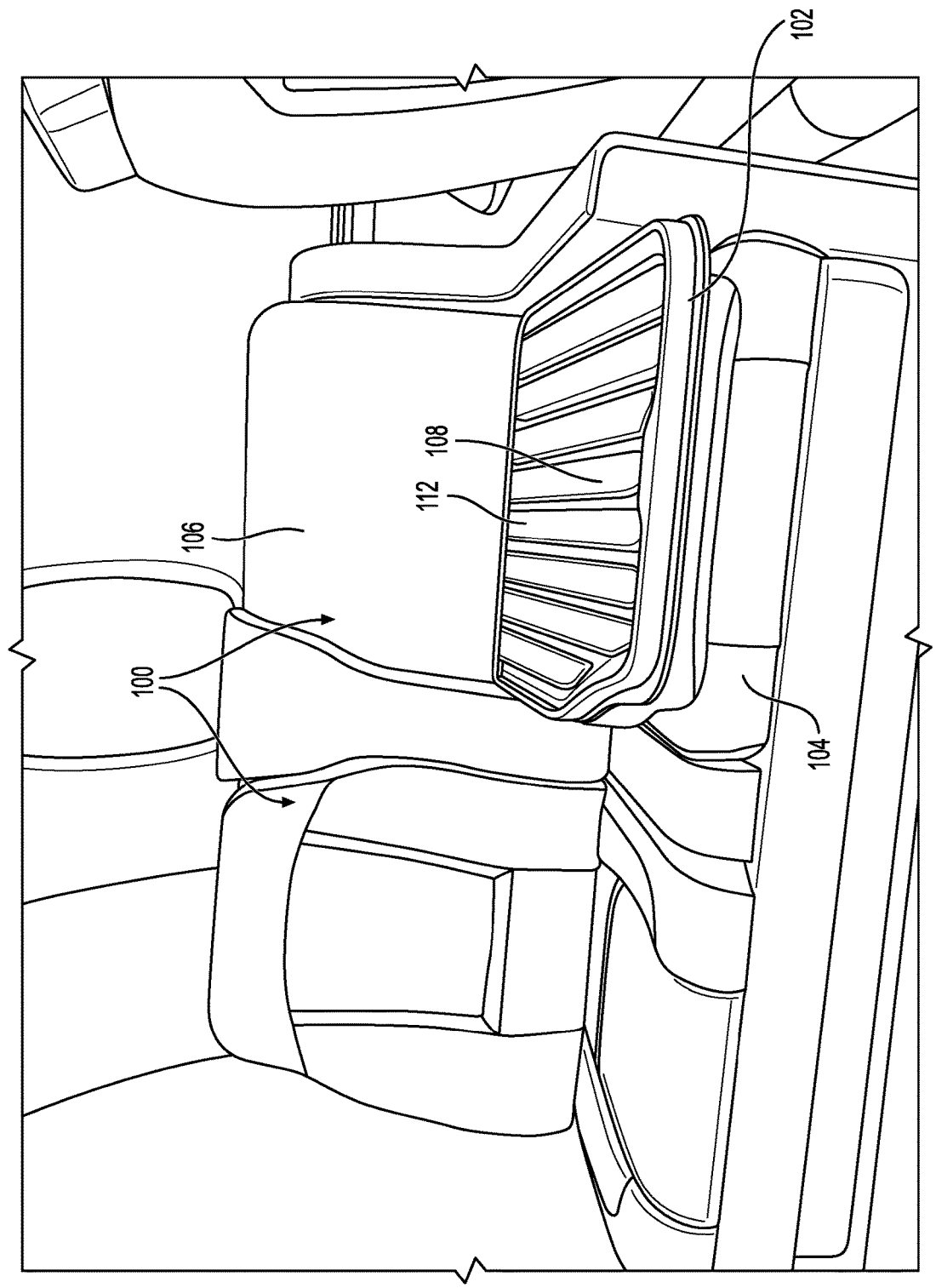
FIG. 2B illustrates a front perspective view of the second embodiment of the aircraft couch seat with one foldable section in a down position and another foldable section in an up position.

Foldable section 102 may comprise a top surface 108 that is exposed when foldable section 102 is moved to the down position. When foldable section 102 is in the up position, as illustrated in FIG. 1A, top surface 108 may abut against seat back 106. In some embodiments, top surface 108 comprises one or more recesses 110, which can be used as cup holders. In some embodiments, top surface 108 comprises a protective mat 112 (see FIGS. 1B, 2A, and 2B) thereon to aid in retaining luggage. In some embodiments, protective mat 112 comprises rubber, vinyl, synthetic rubber, silicon, plastic, polyvinyl chloride (PVC), polyurethane (PU), and other like slip-resistant materials. In some embodiments, protective mat 112 may be a neoprene (polychloroprene) compression-molded mat. In embodiments for aviation use, protective mat 112 comprises a material that meets standard governmental burn requirements. In some embodiments, protective mat 112 comprises various mat features 114 to reduce the likelihood that luggage or other items placed thereon slide around or off aircraft seat 100. For example, mat features 114 may comprise various ridges, knobs, ribs, corrugations, bumps, knurls, treads, crevices, coatings, or any combination thereof. In some embodiments, protective mat 112 is integrated with top surface 108. In some embodiments, protective mat 112 is attachable and removable from top surface 108. Protective mat 112 may comprise cutouts for recesses 110. In some embodiments, an additional and/or alternative protective mat 112 is attached to seat back 106. In some embodiments, a protective mat 112 attached to seat back 106 may have mat features 114 omitted and thereby comprise a substantially smooth surface. Protective mat 112 may be used in various other places throughout an aircraft as will be discussed in further detail below with respect to FIG. 13. Protective mat 112 may have different shapes, sizes, materials, and mat features 114 in each location.

Figure 4:
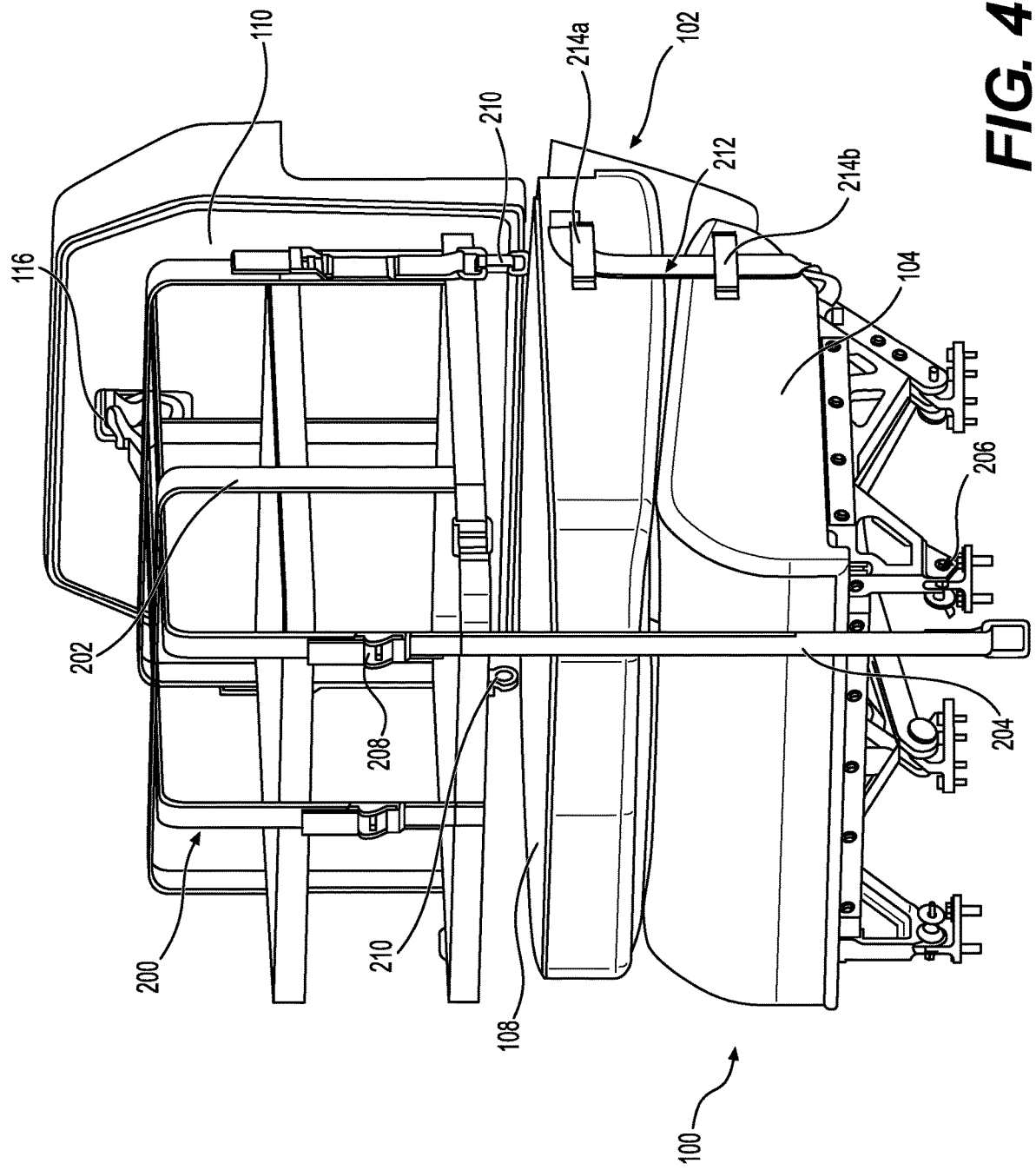
FIG. 4 illustrates a baggage restraint net for use with a seat when the foldable section is in the down position for some embodiments.

As shown, foldable section 102 may also comprise any number of anchors 116 for attaching to a baggage restraint net 200 (see FIG. 4). Anchors 116 may comprise any type of anchoring mechanism such as D-rings, rings, loops, snaps, and/or magnets. Anchors 116 may comprise metal or hard plastic material. Anchors 116 may be capable of opening. As illustrated, foldable section 102 may comprise three anchors 116 for each foldable section 102, with two anchors being disposed on top surface 108 and a single anchor being disposed on seat back 106. In some embodiments, the two anchors 116 on top surface 108 may be disposed substantially near the back hinged area at opposite ends of top surface 108. In some embodiments, the anchor 116 on seat back 106 is disposed substantially near the top center of seat back 106. Various other arrangements of anchors 116 are considered herein, such as two anchors 116 on each of the top surface 108 and seat back 106, or a single anchor 116 on top surface 108 and two anchors 116 on opposite ends of seat back 106. In some embodiments, protective mat 112 is molded or otherwise formed with cutouts for anchors 116. In some embodiments, seat back surface 106 comprises one or more depressions or cavities for disposing anchors 116 therein. As will be discussed in further detail below with respect to FIG. 10, anchors 116 may be housed, such as magnetically, in a depression on top surface 108 and removed when needed. In some embodiments, anchors 116 are secured to seat back 106 and/or top surface 108 via a fabric loop or magnetically.

Figure 6:
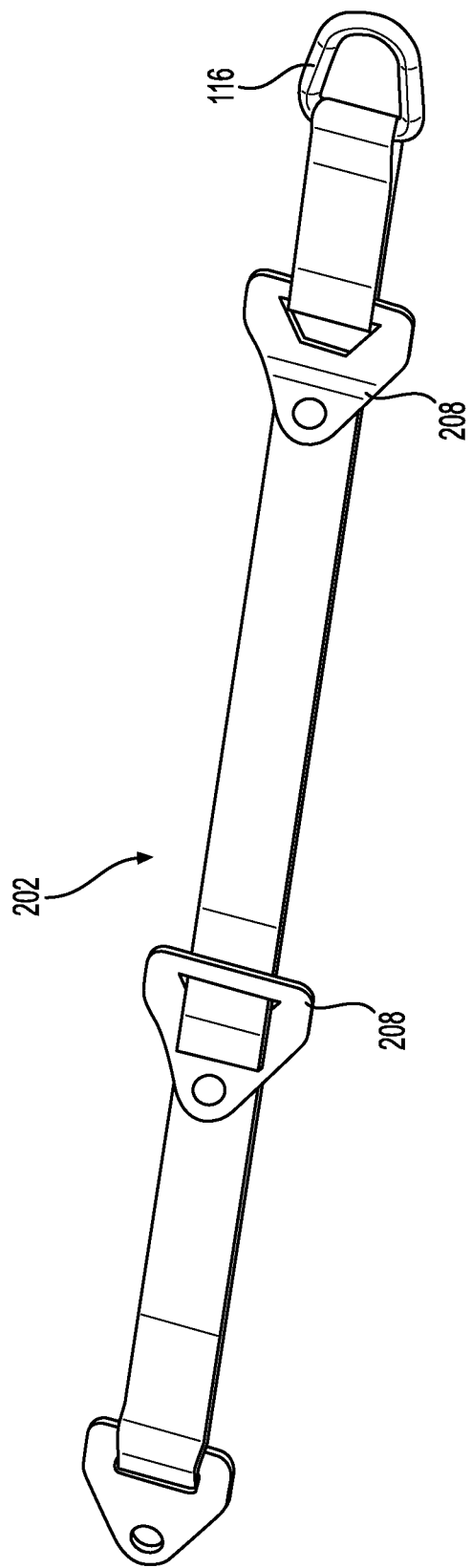
FIG. 6 illustrates a strap for use in the baggage restraint net in some embodiments.

As illustrated in FIG. 4, in some embodiments, a baggage restraint net 200 may be attached to aircraft seat 100. Baggage restraint net 200 may prevent items placed on top surface 108 from sliding off aircraft seat 100. In some embodiments, baggage restraint net 200 attaches to seat back 106 and top surface 108 via anchors 116. In some embodiments, baggage restraint net 200 is substantially rectangular when expanded and comprises a plurality of straps 202 for securing items therein, such as shown in FIG. 6. In some embodiments, the plurality of straps 202 comprise horizontal straps that can be arranged substantially parallel to top surface 108 when foldable section 102 is in the down position and vertical straps that can be substantially perpendicular to the horizontal straps, thus forming a substantially rectangular cage for securing items therein. In some embodiments, baggage restraint net 200 is configured to be substantially spherical or cylindrical. Baggage restraint net 200 may comprise any arrangement of straps 202. In some embodiments, straps comprise a flexible material, such as fabric, nylon, plastic, rubber, and/or elastic such that they can substantially conform to the materials held thereby. In some embodiments, straps 202 may be rigid such as to form a hard cage.

Figure 5:
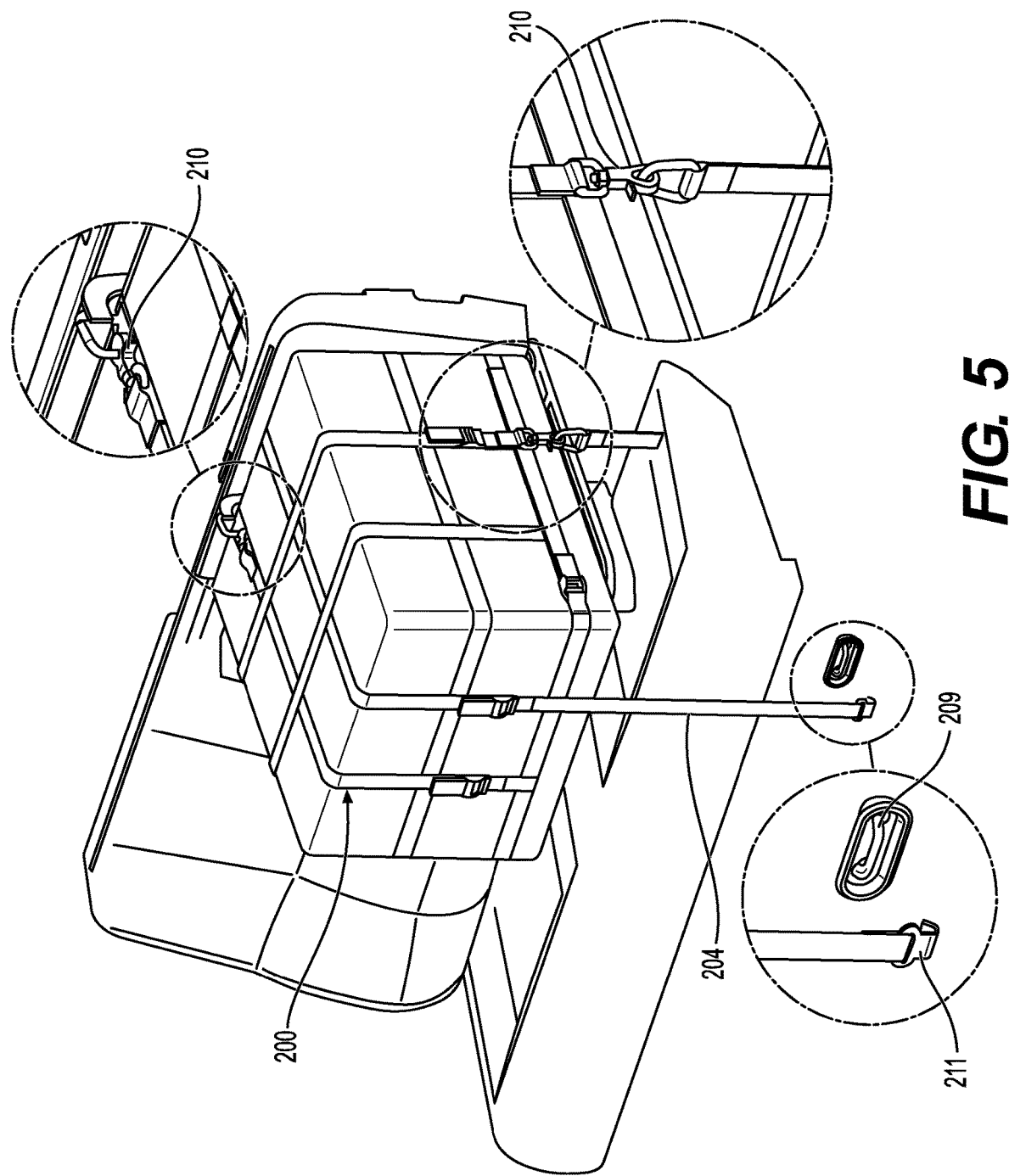
FIG. 5 illustrates an embodiment of a baggage restraint net in use with baggage held therein.

In some embodiments, the plurality of straps 202 comprises at least one securing strap 204 configured to attach to a seat support 206 and/or a lower surface such as the floor of the aircraft. Securing strap 204 may attach to seat support 206 and/or the floor via an anchor 116, such as a D-ring, a clip, a carabiner, or other like fastening means. In some embodiments, as seen in FIG. 5, securing strap 204 may have a bottom end configured to attach via a hook 211 or other attachment mechanism to a handle or other anchor 209 integrated into the lower seat support structure or floor of the aircraft or vehicle. While securing strap 204 is illustrated as extending substantially vertically, in some embodiments, securing strap 204 may extend substantially horizontally and attach to seat back 106, a seat back 106 of an adjacent or nearby aircraft seat 100, or a wall of the aircraft, or other nearby structure. In some embodiments, straps 202 can be adjusted via harnesses or buckles 208. In some embodiments, any or all straps 202 may comprise any number of buckles 208 for tightening and/or loosening straps 202, as seen in FIG. 6. As such, in some embodiments, baggage restraint net 200 may be cinched vertically and/or around its circumference to secure items disposed therein.

Figure 3A:
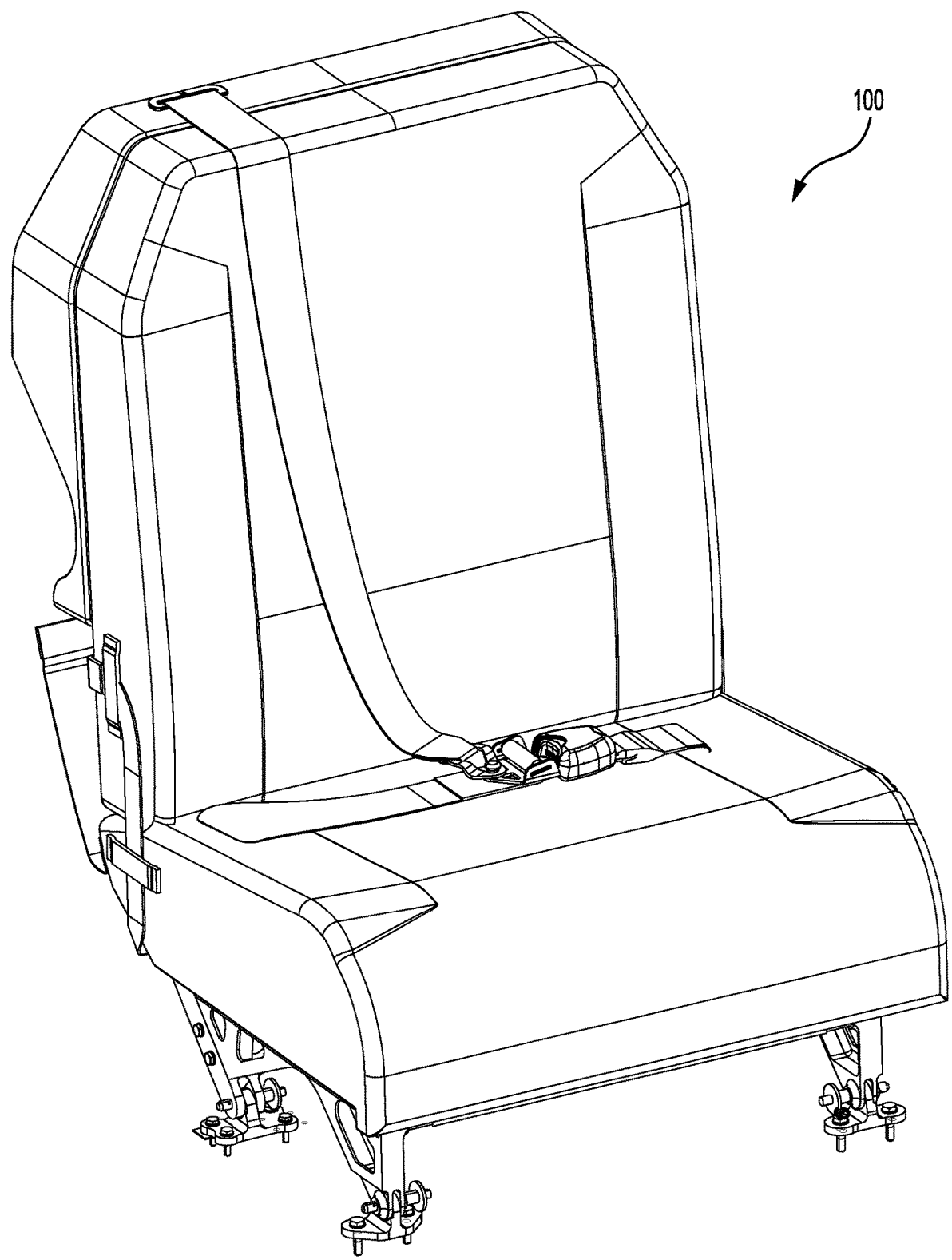
FIG. 3A illustrates a perspective view of a third embodiment of a single aircraft seat with a foldable section in an up position.
Figure 3B:
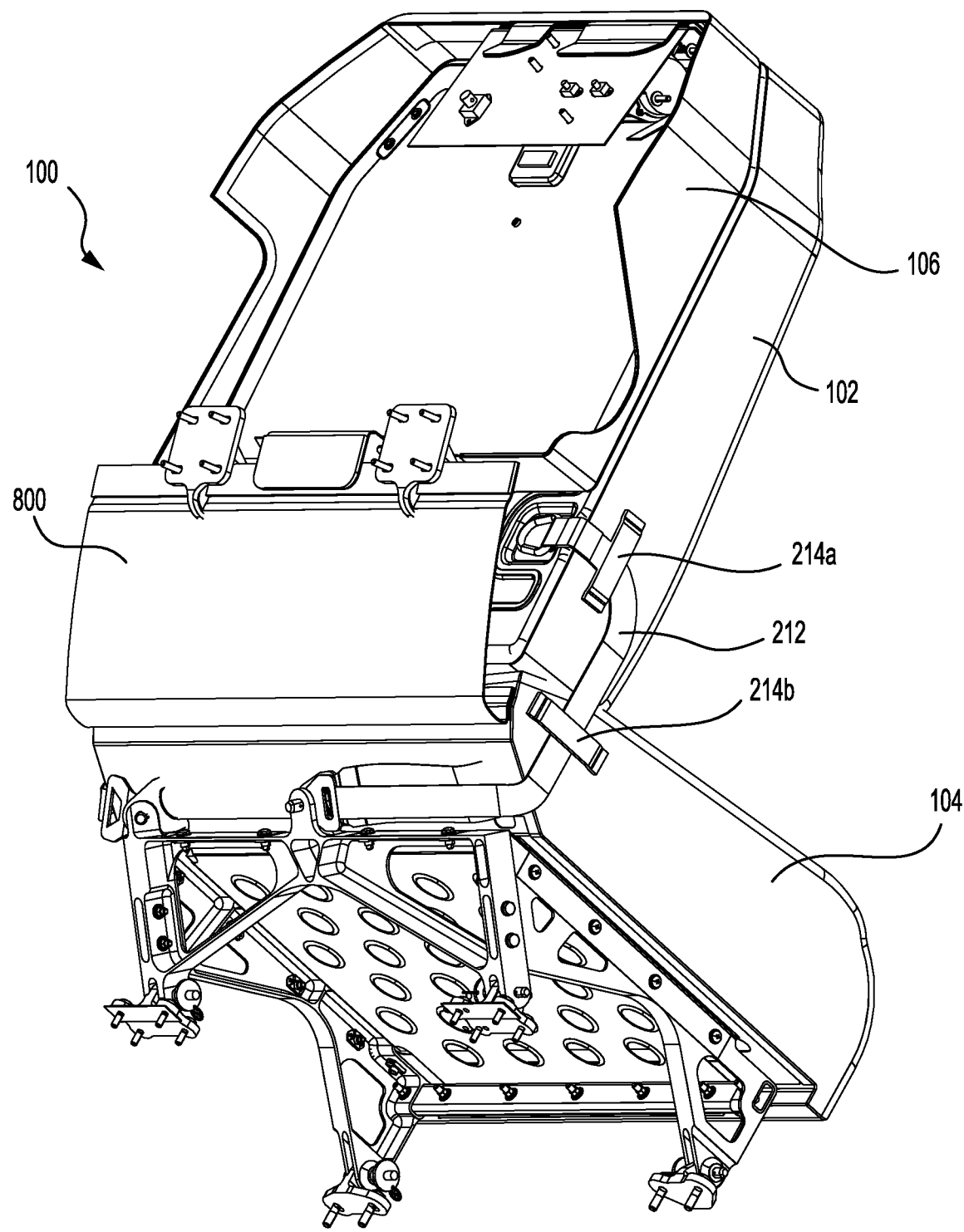
FIG. 3B illustrates a rear perspective view of the single aircraft seat of FIG. 3A.
Figure 3C:
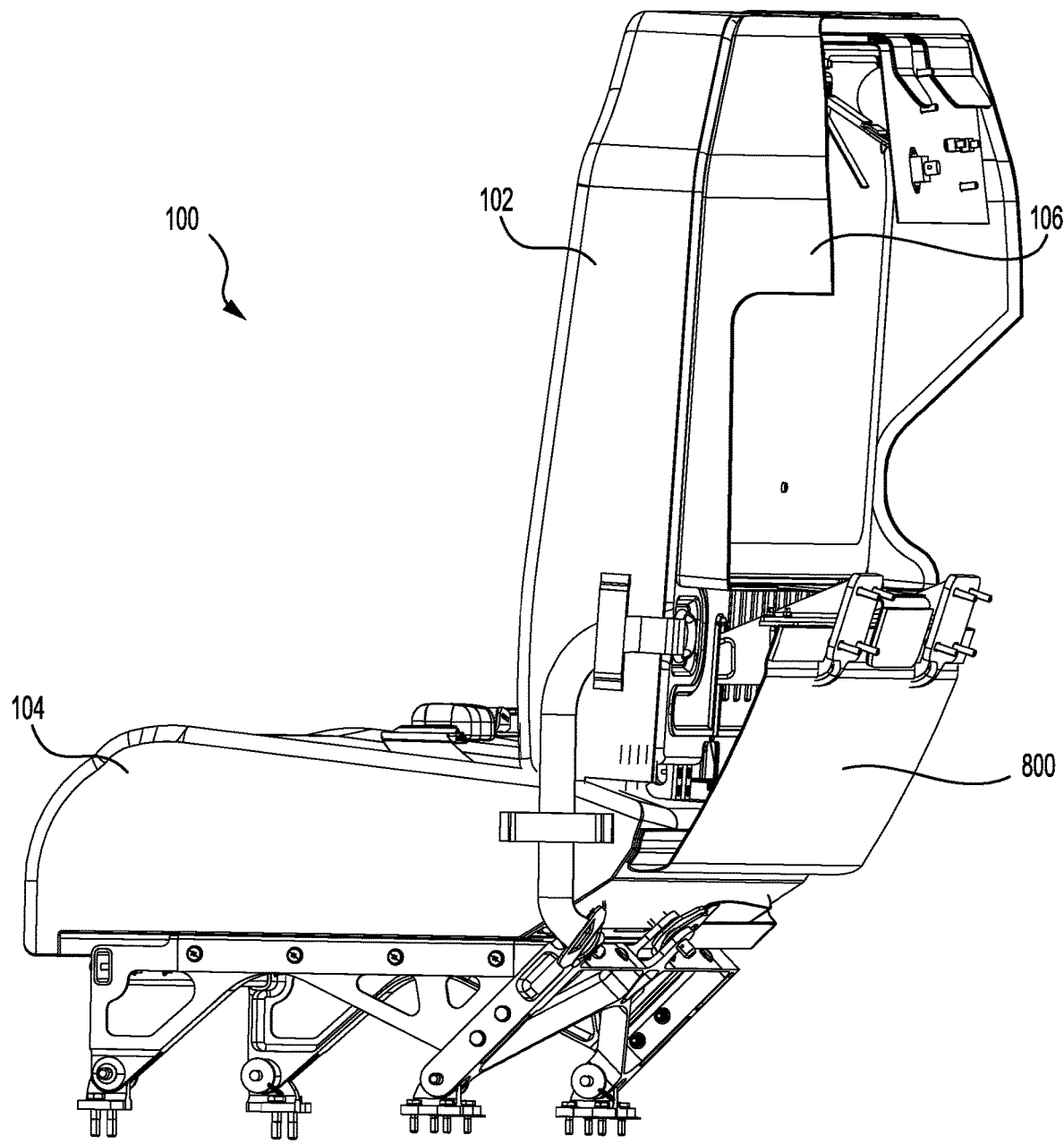
FIG. 3C illustrates a side perspective view of the single aircraft seat of FIG. 3A.

As described above, baggage restraint net 200 may be secured to aircraft seat 100 via anchors 116. In some embodiments, such as that illustrated in FIGS. 3A-3C, a side of foldable section 102 includes a first loop 214a, a side of seat base 104 includes a second loop 214b, and a belt 212 is received through first loop 214a and second loop 214b. In some embodiments, a similar first loop 214a, second loop 214b, and belt 212 is provided on each side of the seat. In some embodiments, straps 202 include an attachment mechanism, such as clip or hook 210, on the distal end thereof for attaching to the belt 212, as seen in FIG. 4. In some embodiments, straps 202 may include an attachment mechanism 210 for connecting to other anchors and/or straps, such as seen in FIG. 5. Anchors 116 may be removed from the top surface 108 and may be attached to belt 212. Hook 210 may then be attached to anchor 116 such that straps 202 are secured to the aircraft seat 100 and/or seat support 206. In some embodiments, additional anchors 116 may be provided on belt 212. Alternatively, in some embodiments, anchors 116 may be attached to top surface 108 and extend therefrom to hooks 210. In some embodiments, an anchor 116 attached to seat back 106 extends therefrom and attaches directly or indirectly to a portion of strap 202. In some embodiments, anchor 116 may be connected directly to the airframe or other surrounding structure through an opening or cutout in seat back 106. In some embodiments, baggage restraint net 200 can be stowed in an alternative location when aircraft seat 100 is in the up position.

Figure 10:
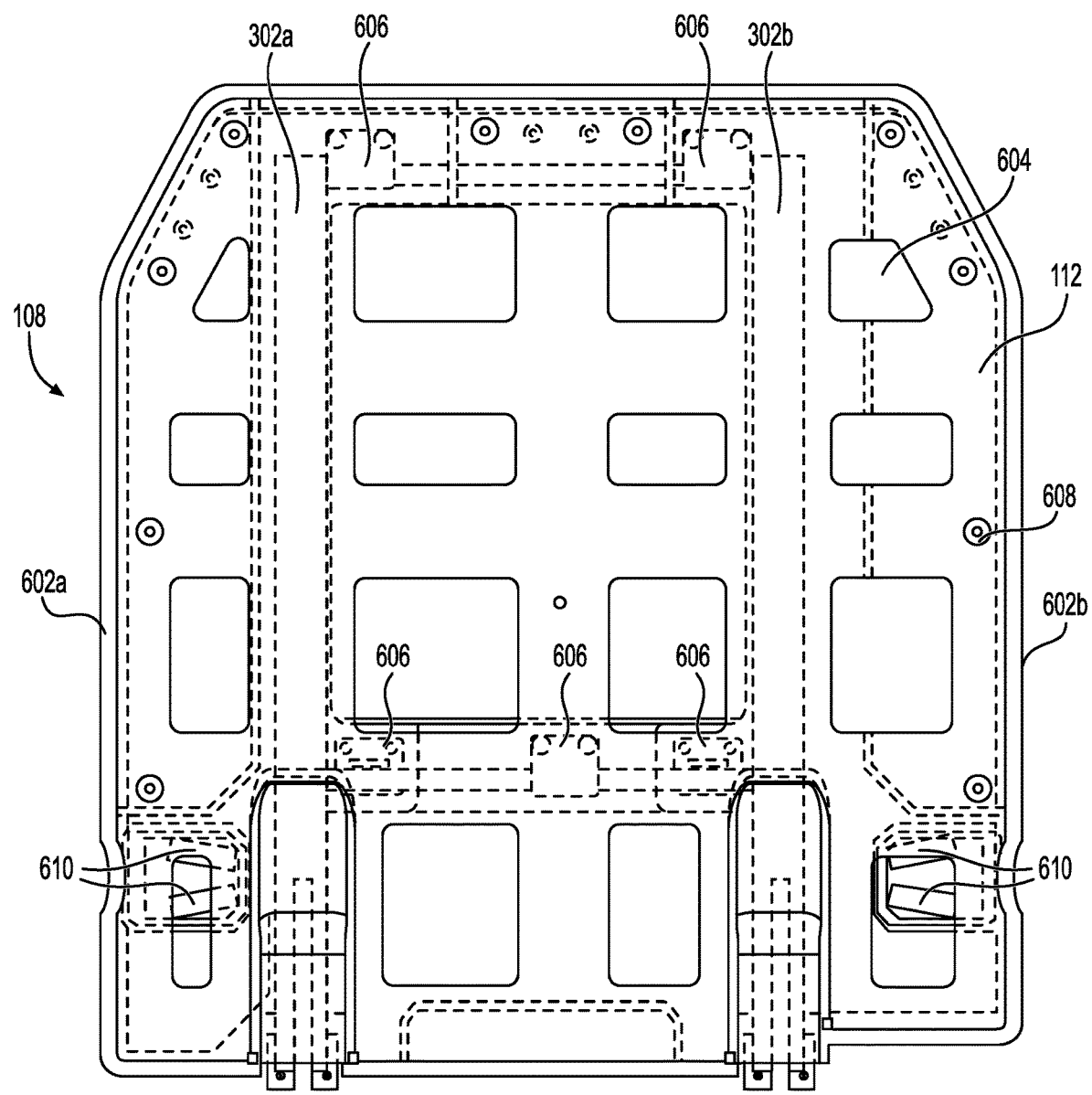
FIG. 10 illustrates a planar view of a top surface of the foldable section for some embodiments.

FIGS. 7A-7B illustrates a first embodiment having first hinge mechanism 300, which is attached to foldable section 102. FIG. 7A illustrates first hinge mechanism 300 where foldable section 102 is in an up position and FIG. 7B illustrates first hinge mechanism 300 where foldable section 102 is in a down position. The upholstery portion of the seat 100, which would be adjacent first support 302 and on an opposite side from top surface 108, is not shown in FIG. 7A-7B. First hinge mechanism 300 may comprise a first support 302 and a second support 304. First support 302 and second support 304 may be connected to and rotate about pivot point 306. In some embodiments, first support 302 rotates about pivot point 306, and second support 304 maintains substantially the same position when moving foldable section 102 between the up and down positions. Foldable section 102 can be attached to the airframe of an aircraft via an intercostal 408. In some embodiments, first support 302 is integrated within foldable section 102. As illustrated in FIG. 10, foldable section 102 may comprise two first supports 302a, 302b on each side of the aircraft seat 100, with each first support 302a, 302b connected to a respective second support 304. First support 302 may comprise a first end 308a and a second end 308b on either side of pivot point 306. First end 308a may be located near the front of foldable section 102, and second end 308b may be located near seat back 106 of foldable section 102.

To retain foldable section 102 in the down position, a first magnet 310a may be disposed near second end 308b of first support 302, and a second magnet 310b may be disposed on second support 304. In some embodiments, first magnet 310a and second magnet 310b are opposite polarities such that first magnet 310a and second magnet 310b are attracted to one another. In some embodiments, an additional third magnet 312a is disposed near first end 308a of first support 302. In some embodiments, third magnet 312a is disposed within top surface 108. In some embodiments, third magnet 312a is configured to retain foldable section 102 in the up position. In some embodiments, seat back 106 comprises a fourth magnet 312b for cooperating with third magnet 312a.

As illustrated in FIG. 7B, foldable section 102 has been moved to the down position by detaching third magnet 312a from fourth magnet 312b on seat back 106. To retain foldable section 102 in the down position, first magnet 310a may attach to second magnet 310b as shown by rotating foldable section 102 (via first supports 302) about pivot point 306. In some embodiments, in the down position, top surface 108 forms an angle of about 75° to about 95° with seat back 106. In some embodiments, magnets 310a, 310b, 312a, 312b are configured to retain foldable section 102 in the up and/or down positions while having a magnetic field strength such that a person can easily pull and push foldable section 102 to change between the up and down positions.

Figure 8:
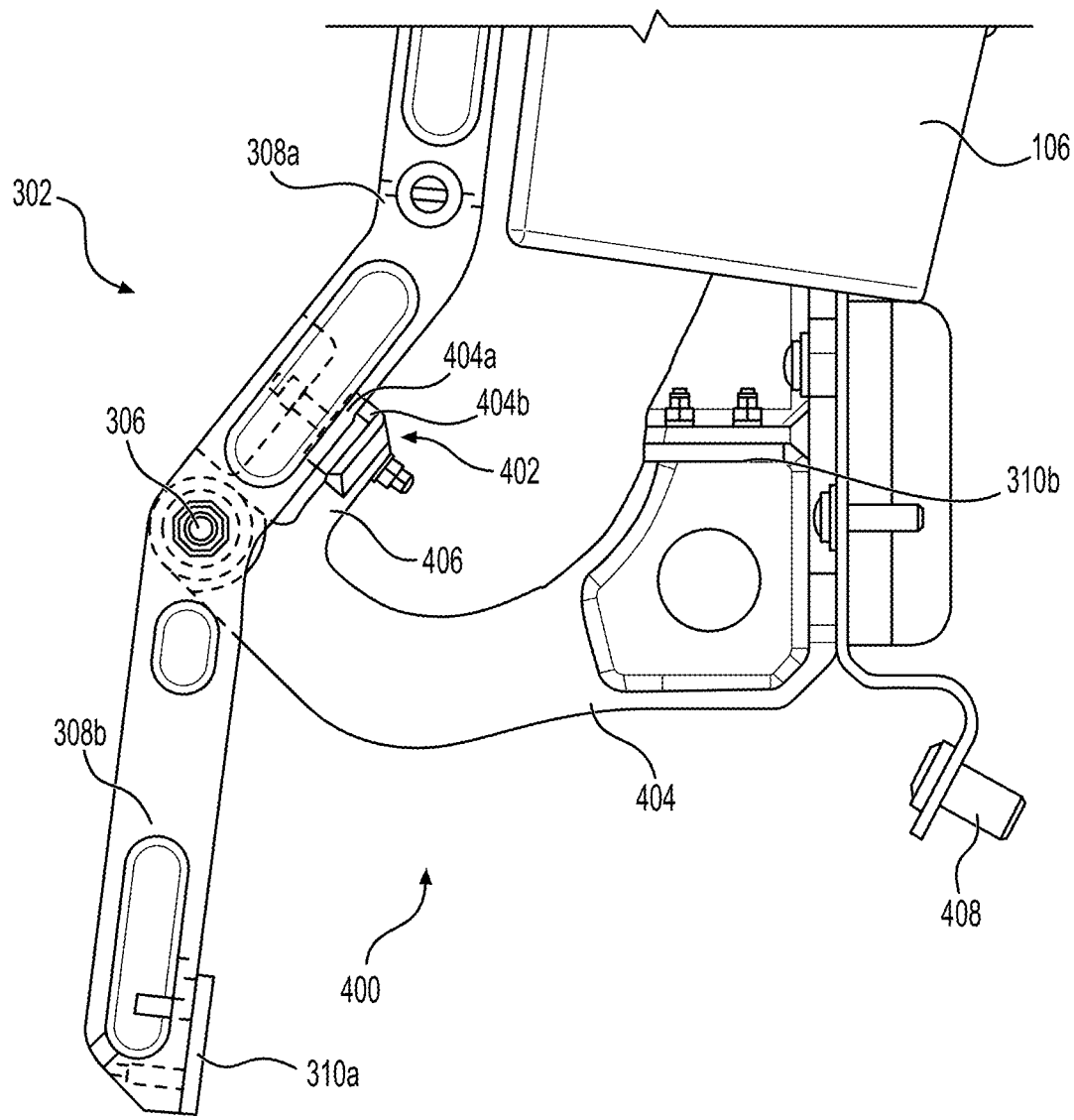
FIG. 8 illustrates a second embodiment of a hinge mechanism for the seat in the up position.

FIG. 8 illustrates a second embodiment having a second hinge mechanism 400, which is attached to foldable section 102 of aircraft seat 100. The upholstery portion of the seat 100, which would be adjacent first support 302 and on an opposite side from top surface 108, is not shown in FIG. 8. As shown, second hinge mechanism 400 may comprise substantially the same structure as first hinge mechanism 300 with first support 302 and second support 404 connected to and being rotatable around pivot point 306. However, second support 404 may have a different structure than second support 304. Second support 404 may be shaped to include an arm 406 for receiving an additional or alternative magnet assembly 402. Second hinge mechanism 400 may similarly comprise first magnet 310a on first support 302 and second magnet 310b on second support 404 configured to retain foldable section 102 in the down position as illustrated with respect to FIG. 7B. However, to retain foldable section 102 in the up position, second hinge mechanism 400 may comprise magnet assembly 402 as shown. Magnet assembly 402 may comprise a first magnet 404a attached to first support 302 and a second magnet 404b attached to arm 406 on second support 404. In some embodiments, first magnet 404a and second magnet 404b comprise opposite polarities such that first magnet 404a and second magnet 404b are attracted to one another. In some embodiments, aircraft seat 100 comprises both magnet assembly 402, third magnet 312a, and fourth magnet 312b for securing foldable section 102 in the up position.

Figure 9:
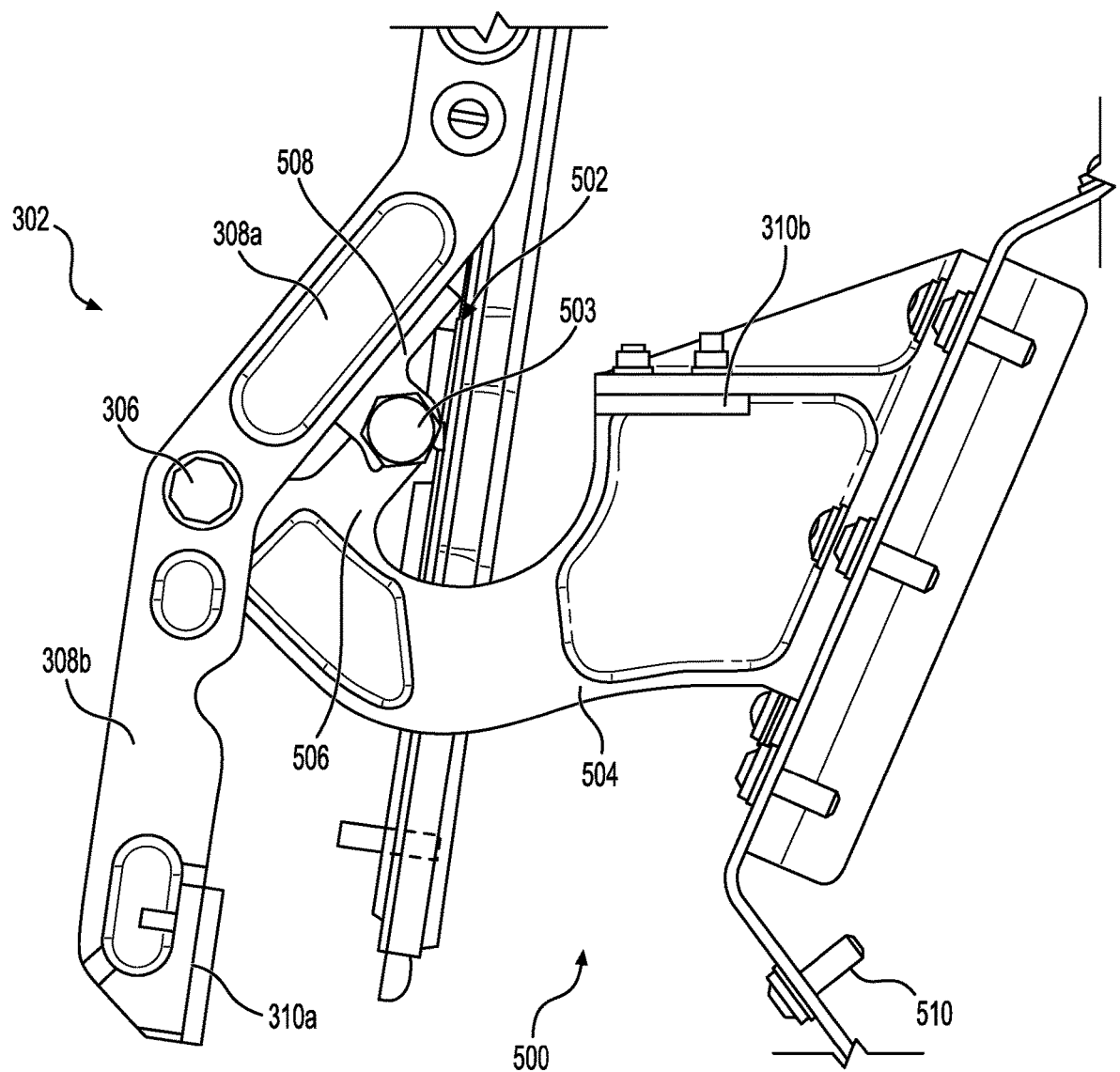
FIG. 9 illustrates a third embodiment of a hinge mechanism for the seat in the up position.

FIG. 9 illustrates a third embodiment having third hinge mechanism 500, which is attached to foldable section 102 of aircraft seat 100. The upholstery portion of the seat 100, which would be adjacent first support 302 and on an opposite side from top surface 108, is not shown in FIG. 9. As shown, third hinge mechanism 500 may comprise substantially the same structure as first hinge mechanism 300 and second hinge mechanism 400 with first supports 302 and second supports 504 connected to and rotatable around pivot points 306. However, as illustrated, second support 504 may comprise different geometries in some embodiments. In some embodiments, the geometry of second support 504 varies to accommodate variously shaped aircraft seats 100. For example, second support 504 may be thicker to support a heavier aircraft seat 100. Foldable section 102 may be attached to the airframe of an aircraft via a fastener 510. Third hinge mechanism 500 may similarly comprise first magnet 310a on first support 302 and second magnet 310b on second support 504 for retaining foldable section 102 in the down position. However, to retain foldable section 102 in the up position, third hinge mechanism 500 may comprise clip assembly 502 as shown. In some embodiments, clip assembly 502 is disposed in substantially the same location as magnet assembly 402 illustrated in FIG. 8 and may be an alternative thereto.

In some embodiments, clip assembly 502 comprises a clip 508 that is mounted to first support 302 and a fastener 503 that is attached to arm 506 of second support 504. When the foldable section 102 is in the up position, clip 508 engages with fastener 503. When aircraft seat 100 is moved to the down position, clip 508 disengages from fastener 503. In some embodiments, fastener 503 comprises a rod, a ball or other attachment means that can be removably received within clip 508. In some embodiments, clip 508 has expandable sides for receiving the fastener 503 therein. In some embodiments, arm 506 includes a small slot for receiving fastener 503 therein such that fastener 503 can be adjusted to ensure first support 302 is substantially parallel with seat back 106 when in the up position. In some embodiments, aircraft seat 100 may comprise both clip assembly 502, third magnet 312a, and fourth magnet 312b for retaining foldable section 102 in the up position.

FIG. 10 illustrates a planar view of top surface 108 of foldable section 102 for some embodiments. As described above, foldable section 102 may comprise first support 302 in two locations, denoted hereinafter as left first support 302a and right first support 302b. In some embodiments, left first support 302a is disposed about one-fourth to about one-third of the distance from first lateral end 602a to second lateral end 602b of top surface 108. In some embodiments, right first support 302b is disposed about two-thirds to about three-fourths of the distance from first lateral end 602a to second lateral end 602b of top surface 108. First supports 302a, 302b may extend substantially along the length of foldable section 102 and extend substantially parallel to one another. First supports 302a, 302b may be disposed below protective mat 112 and above upholstery 604 in some embodiments. In some embodiments, upholstery 604 is disposed on a front surface of foldable section 102 that an occupant may abut when sitting in aircraft seat 100 (as seen in FIG. 1A). By rotating foldable section 102 to the down position, upholstery 604 may be protected when luggage is stored on aircraft seat 100. As described above, first supports 302a, 302b may rotate about pivot points 306 to move foldable section 102 between the up position and the down position.

Figure 11:
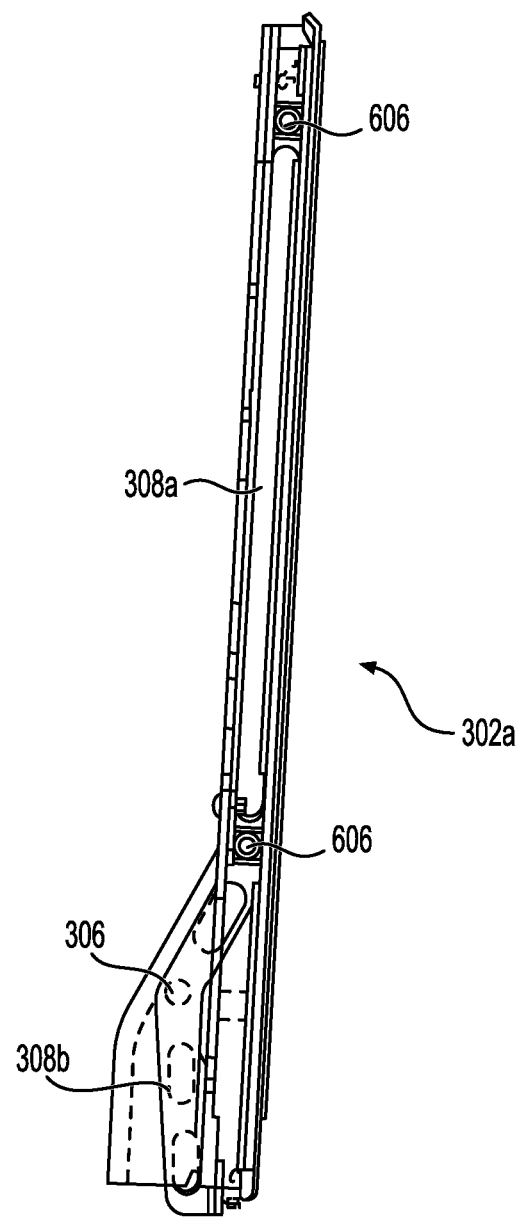
FIG. 11 illustrates a section view of a support for the foldable section for some embodiments.

In some embodiments, protective mat 112 and/or upholstery 604 are held in place via clips 606. As illustrated in FIG. 11, displaying a sectional view of first supports 302a, 302b, clips 606 may be connected to or integrated within first support 302. In some embodiments, first supports 302a, 302b comprise two clips 606 for attaching protective mat 112 and/or upholstery 604 thereto.

Fasteners 608 may also be used to attach protective mat 112 and/or upholstery 604 to foldable section 102. In some embodiments, a plurality of fasteners 608 are arranged on an outer edge of foldable section 102. Fasteners 608 may comprise screws, nuts, bolts, staples, magnets, or any combination thereof to secure protective mat 112 and/or upholstery 604 to foldable section 102.

As described above, anchors 116 may be held in place within a depression on top surface 108 via magnets 610. In some embodiments, each anchor 116 is secured with two magnets 610. When baggage restraint net 200 is used, anchors 116 may be detached from magnets 610 and attached to hooks 210 and belts 212 as described above with respect to FIG. 4.

Figure 12:
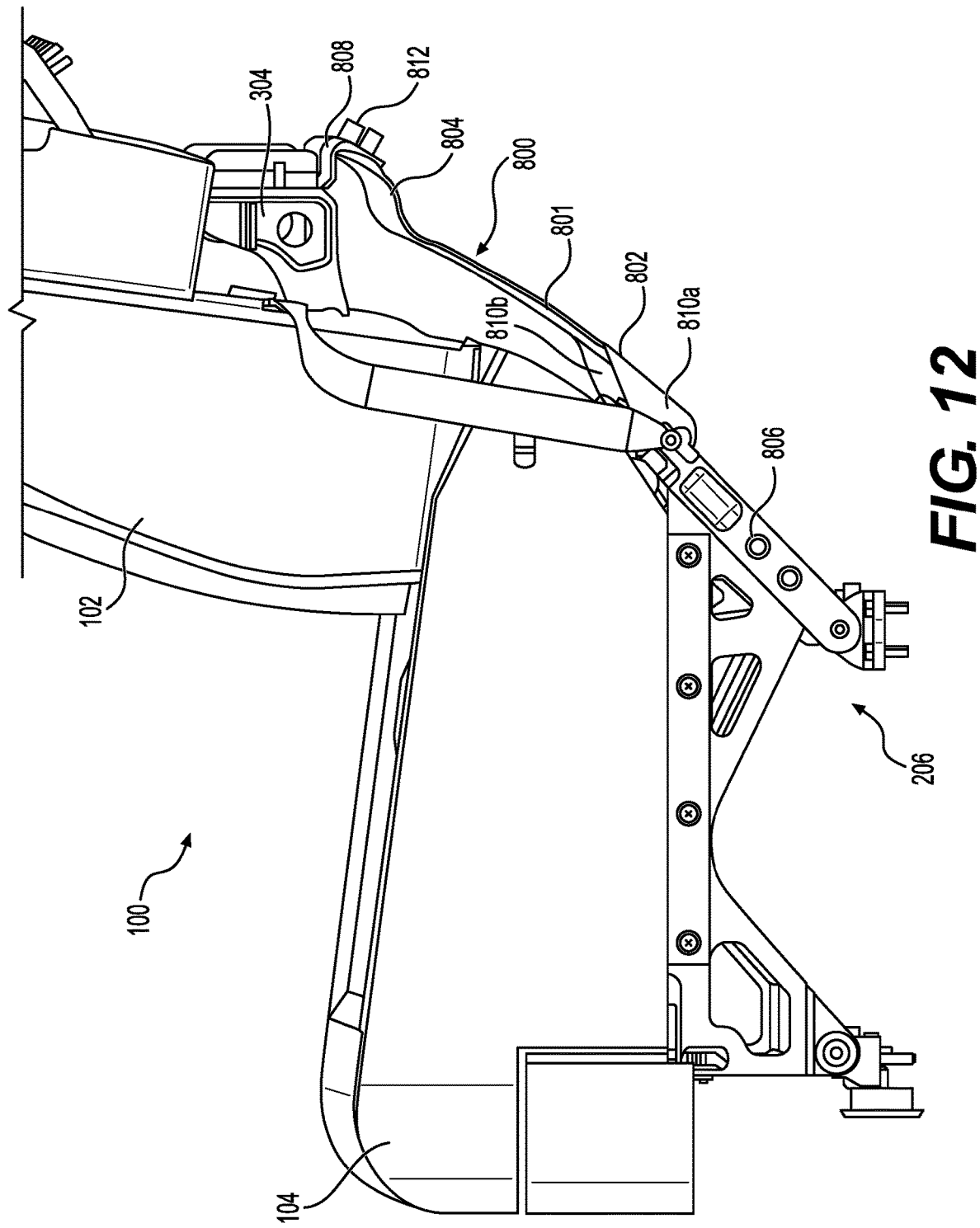
FIG. 12 illustrates an item catcher for use with the aircraft seat for some embodiments.

Turning now to FIG. 12, an item catcher assembly 800 is illustrated for some embodiments. Aircraft seat 100 may comprise item catcher assembly 800 to mitigate the chances of coins and other small items from falling behind aircraft seat 100 where they may be difficult to reach by an occupant. In some embodiments, an item catcher 801 comprises netting, cloth, vinyl, nylon, mesh, and the like to catch small items. In some embodiments, item catcher 801 comprises a plurality of holes therethrough to allow crumbs and the like to fall through while still catching larger items such as coins. As shown, item catcher assembly 800 may comprise a first end 802 and a second end 804. First end 802 may include supporting arm 806 connected to seat support 206. Second end 804 may include back connector 808. In some embodiments, first end 802 is configured to catch items as they slide down item catcher 801. In some embodiments, first end 802 may comprise first side wall 810*a* and second side wall 810*b* to prevent items from falling over the sides of item catcher 801.

In some embodiments, item catcher 801 is configured to attach to supporting arm 806 via various attaching means. For example, item catcher 801 may be attached via clamps, clips, bolts, screws, magnets, sews, staples, or any combination thereof. In some embodiments, item catcher 801 is configured to attach to back connector 808 via fasteners 812. In some embodiments, fasteners 812 comprise screws, bolts, nuts, staples, clips, clamps, magnets, hook-and-loop fasteners, or any combination thereof. In some embodiments, back connector 808 attaches to second support 304 as shown. In some embodiments, back connector 808 similarly attaches to second support 404 or 504.

Figure 13:
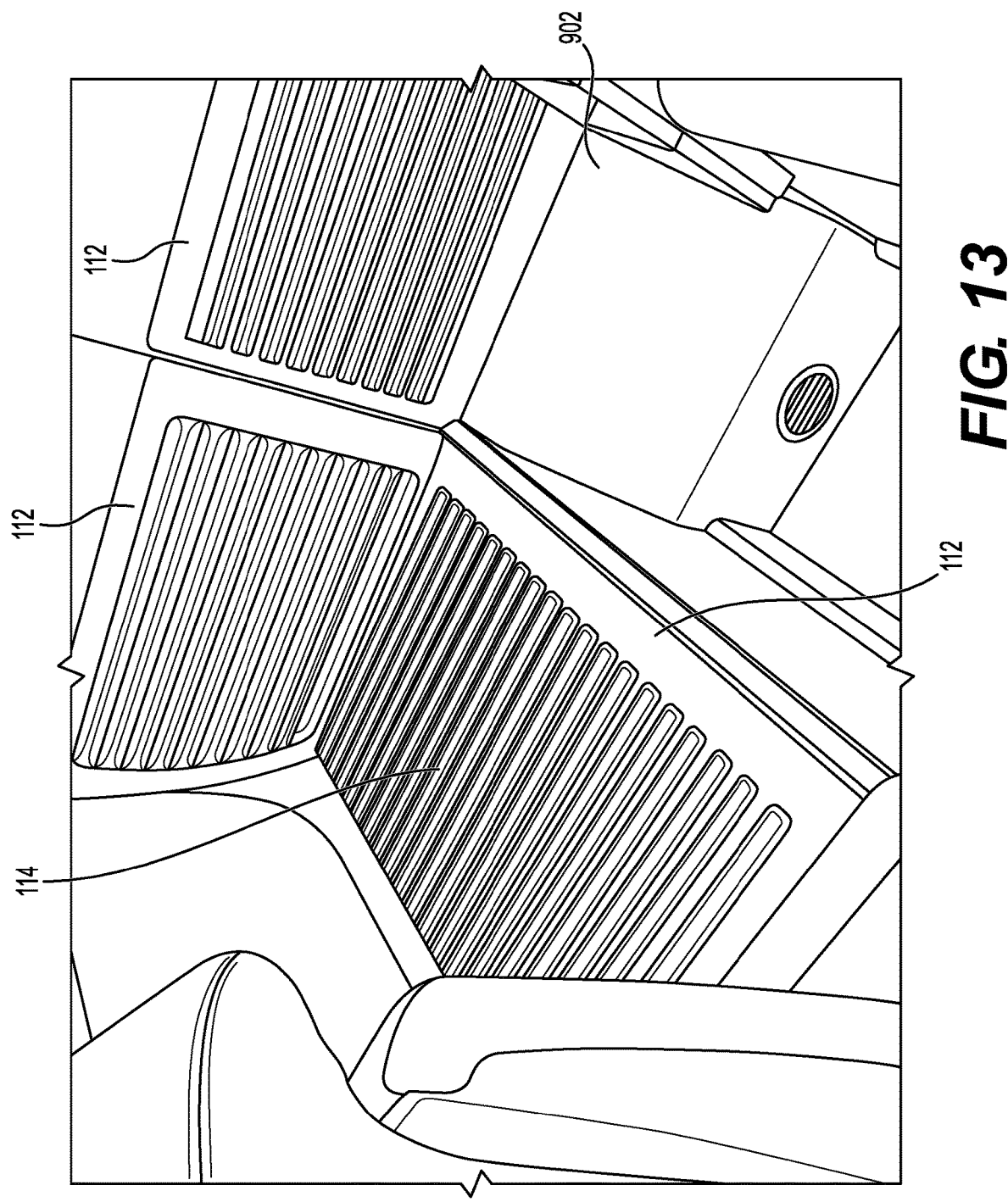
FIG. 13 illustrates a protective mat that may be used in additional locations for some embodiments.

FIG. 13 illustrates a protective mat 112 for some embodiments. In some embodiments, protective mat 112 is used in conjunction with foldable section 102 and placed onto seat back 106 and/or top surface 108, as shown and described above (see e.g., FIG. 1B). In some embodiments, protective mat 112 is a molded mat that comprises various materials, such as rubber, vinyl, synthetic rubber, silicon, plastic, polyvinyl chloride (PVC), polyurethane (PU), and other like slip-resistant materials. Protective mat 112 may also comprise mat features 114 to prevent items from sliding off protective mat 112 as described above.

As illustrated in FIG. 13, protective mat 112 may be used in additional locations throughout the interior of an aircraft and provide a safe place to store luggage without damaging the upholstery of the surface. For example, as shown in FIG. 13, protective mat 112 may be placed in the bulkhead of an aircraft. In some embodiments, protective mat 112 is disposed on the avionics box in the aft bulkhead, along with walls and other bulkhead surfaces. Thus, occupants may store luggage and other items in the bulkhead without damaging carpet or upholstery on bulkhead surface. In embodiments, a slanted portion 902 is covered with carpeting and is slanted to conceal duct work below.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A foldable vehicle seat comprising:
a seat base having a seat support frame;
a seat back extending from the seat base;
a foldable section connected to the seat back, the foldable section having a folded configuration and an unfolded configuration and comprising:
a hinge mechanism having a pivot point;
a first support connected to the hinge mechanism and rotatable about the pivot point, said first support having a first magnet;
a second support connected to the hinge mechanism, said second support having a second magnet,
wherein the first magnet and the second magnet are configured to retain the foldable section in the folded configuration; and
a top surface is configured to store luggage thereon, the top surface being exposed when the foldable section is in the folded configuration.

2. The foldable vehicle seat of claim 1, wherein the first support includes a third magnet and the seat back includes a fourth magnet complimentary to the third magnet, wherein the third magnet and fourth magnet are configured to retain the foldable seat in the unfolded configuration.

3. The foldable vehicle seat of claim 1, wherein the top surface includes a third magnet and the seat back includes a fourth magnet complimentary to the third magnet, wherein the third magnet and fourth magnet are configured to retain the foldable seat in the unfolded configuration.

4. The foldable vehicle seat of claim 1, wherein the second support further includes a clip assembly configured to retain the foldable seat in the unfolded configuration.

5. The foldable vehicle seat of claim 1, wherein the foldable section further comprises a plurality of anchors configured to engage with a selectively attachable baggage restraint.

6. The foldable vehicle seat of claim 5, wherein the anchors are selectively detachable from the foldable section.

7. The foldable vehicle seat of claim 5, wherein the selectively attachable baggage restraint is substantially rectangular and comprises a plurality of straps for securing items therein, wherein the plurality of straps comprises horizontal straps that are arranged substantially parallel to the top surface when in the folded configuration and vertical straps that are substantially perpendicular to the horizontal straps.

8. The foldable vehicle seat of claim 1, wherein the top surface of the foldable section includes at least one recess configured to act as a cupholder.

9. The foldable vehicle seat of claim 1, wherein the top surface of the foldable section includes a protective mat fashioned from a material selected from the group consisting of:
rubber, vinyl, synthetic rubber, silicon, plastic, polyvinyl chloride, polyurethane, and neoprene.

10. The foldable vehicle seat of claim 1, further comprising an item catcher assembly located behind the foldable section, the assembly having a first end and a second end, the first end being connected to the seat support frame, and the second end being connected to the second support.

11. The foldable vehicle seat of claim 10, wherein the item catcher assembly includes an item catcher fashioned from a material selected from the group consisting of: netting, cloth, vinyl, nylon, and mesh.

12. The foldable vehicle seat of claim 10, wherein the item catcher assembly includes an item catcher having a plurality of holes therethrough.

13. A foldable vehicle seat comprising:
a seat base;
a seat back extending from the seat base; and a foldable section connected to the seat back, the foldable section comprising:

a first support comprising a first magnet;

a second support connected to the first support at a pivot point, said second support comprising a second magnet, wherein the first support is configured to rotate about the pivot point to move the foldable section to a folded position, wherein the first magnet and the second magnet are configured to retain the foldable section in the folded position; and a top surface configured to store luggage thereon, the top surface being exposed when the foldable section moves to the folded position.

14. The foldable vehicle seat of claim 13, further comprising third and fourth magnets configured to retain the foldable section in an unfolded position.

15. The foldable vehicle seat of claim 13, wherein the top surface of the foldable section forms an angle between about 75 and about 95 degrees with respect to the seat back when in the folded position.

16. The foldable vehicle seat of claim 13, wherein the first support includes a left first support and a right first support, wherein:

the left first support is disposed about one-fourth to about one-third of a distance from a first lateral end of the top surface to a second lateral end of the top surface, the right first support is disposed about two-thirds to about three-fourths of the distance from the first lateral end of the top surface to the second lateral end of the top surface, and the left and right first supports extend substantially along a length of the foldable section and extend substantially parallel to one another.

17. The foldable vehicle seat of claim 13, wherein the top surface of the foldable section includes a plurality of recesses.

18. The foldable vehicle seat of claim 13, wherein the foldable section further comprises a plurality of anchors configured to engage with a selectively detachable baggage restraint.

19. The foldable vehicle seat of claim 13, wherein the top surface of the foldable section includes a protective mat fashioned from a non-slip material.

20. The foldable vehicle seat of claim 19, wherein the top surface of the foldable section includes at least one recess configured to act as a cupholder.

* * * * *